US010116905B2

United States Patent
Meganathan et al.

(10) Patent No.: US 10,116,905 B2
(45) Date of Patent: Oct. 30, 2018

(54) SYSTEM AND METHOD OF VIRTUAL ZONE BASED CAMERA PARAMETER UPDATES IN VIDEO SURVEILLANCE SYSTEMS

(71) Applicant: Honeywell International Inc., Morristown, NJ (US)

(72) Inventors: Deepak Sundar Meganathan, Bangalore (IN); Vivek Gopinath, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 197 days.

(21) Appl. No.: 14/251,887

(22) Filed: Apr. 14, 2014

(65) Prior Publication Data
US 2015/0296188 A1 Oct. 15, 2015

(51) Int. Cl.
 *H04N 7/18* (2006.01)
 *H04N 5/76* (2006.01)
 *G08B 13/196* (2006.01)

(52) U.S. Cl.
 CPC ....... *H04N 7/181* (2013.01); *G08B 13/19645* (2013.01); *G08B 13/19682* (2013.01); *H04N 5/76* (2013.01)

(58) Field of Classification Search
 CPC ..... H04N 7/181; H04N 5/76; G08B 13/19682
 USPC ....................................................... 348/143
 See application file for complete search history.

(56) References Cited

U.S. PATENT DOCUMENTS

| | | | |
|---|---|---|---|
| 6,727,949 B1* | 4/2004 | Saruwatari | H04N 5/23212 348/349 |
| 7,421,484 B2 | 9/2008 | Das | |
| 8,345,101 B2 | 1/2013 | Bobbitt et al. | |
| 9,230,250 B1* | 1/2016 | Parker | G06Q 20/203 |
| 2003/0214582 A1* | 11/2003 | Takahashi | G01C 21/3647 348/116 |

(Continued)

FOREIGN PATENT DOCUMENTS

| | | |
|---|---|---|
| CN | 1554193 A | 12/2004 |
| CN | 101119482 A | 2/2008 |

(Continued)

OTHER PUBLICATIONS

Extended European search report from corresponding EP application 15161214.0, dated Aug. 25, 2015.

(Continued)

*Primary Examiner* — Zhihan Zhou
(74) *Attorney, Agent, or Firm* — Husch Blackwell LLP

(57) ABSTRACT

A method and system that includes a processor of a surveillance system detecting identification of a portion of a secured area via a drawing made by an operator on a graphical representation of the secured area, the processor identifying at least one camera within the identified portion of the secured area, the processor increasing a relative level of picture quality for each of the at least one camera and the processor recording video with the increased level of picture quality from each of the identified at least one camera for a predetermined time period where the picture quality is increased by performing one or more of increasing image resolution, increasing frames per second, decreasing a group of pictures (GOP) value, decreasing a compression ratio and increasing a bit rate.

21 Claims, 6 Drawing Sheets

(56) References Cited

U.S. PATENT DOCUMENTS

| | | | |
|---|---|---|---|
| 2008/0316311 A1* | 12/2008 | Albers | G06F 17/3079 348/143 |
| 2009/0087067 A1* | 4/2009 | Khorasani | A61B 6/025 382/132 |
| 2010/0097470 A1* | 4/2010 | Yoshida | G08B 13/19641 348/159 |
| 2011/0051808 A1* | 3/2011 | Quast | H04N 7/18 375/240.08 |
| 2012/0194336 A1* | 8/2012 | Thiruvengada | G08B 13/19645 340/525 |
| 2012/0317507 A1* | 12/2012 | Gutierrez | H04N 7/181 715/771 |
| 2013/0294646 A1* | 11/2013 | Shaw | G06T 7/0048 382/103 |
| 2015/0142211 A1* | 5/2015 | Shehata | H04N 7/181 701/2 |

FOREIGN PATENT DOCUMENTS

| | | | | |
|---|---|---|---|---|
| CN | 103634571 A | | 3/2014 | |
| GB | 2 408 880 A | | 6/2005 | |
| GB | 2408880 A | * | 6/2005 | ....... G08B 13/19604 |

OTHER PUBLICATIONS

First Office Action and Search Report for corresponding CN patent application 201510171372.5, dated Jul. 20, 2017.

English-language translation of abstract for CN patent application publication 1554193, dated Dec. 8, 2014.

English-language translation of abstract for CN patent application publication 101119482, dated Feb. 6, 2008.

English-language translation of abstract for CN patent application publication 103634571, dated Mar. 12, 2014.

English-language translation of the First Office Action and Search Report for corresponding CN patent application 201510171372.5, dated Jul. 20, 2017.

\* cited by examiner

SYSTEM AND METHOD OF VIRTUAL ZONE BASED CAMERA PARAMETER UPDATES IN VIDEO SURVEILLANCE SYSTEMS

FIELD

The field is directed to security systems and more particularly to video surveillance systems.

BACKGROUND

Systems are known to provide security in one or more predefined secured areas. Security in this case means the detection of threats to the safety of human occupants and/or assets within the secured area.

Threats may be posed from any of a number of different events, such as fire, natural gas, intruders, etc. In order to mitigate the potential damage caused by such threats, it is important to detect threats as early as possible.

Threats may be detected using any of a number of different technologies. For example, some systems may be based entirely upon the use of sensors on doors and windows leading into the secured area and/or the use of a number of fire and/or gas detectors distributed throughout the area.

While detection apparatus is effective is some cases, such apparatus cannot be used in all applications, particularly where large numbers of people are present such as an airport or in industrial applications where low level threats such as flames or the presence of gases part of a manufacturing process. In such cases, security may be supplemented with or substantially replaced with one or more surveillance cameras.

In many cases, the one or more security cameras may be coupled to a corresponding set of security monitors (displays) at a guard station. In this case, a human guard may constantly monitor the displays for indication of threats. The video from each camera may also be recorded via a network video recording system.

While such systems work well, a guard may not always notice a threat displayed on a monitor. Even when a threat is notice by a guard, the guard may not always have time or sufficient cognitive grasp of the situation to effectively optimize the cameras for display or recording of the threat. Accordingly, a need exists for better methods of displaying and recording such threats.

DETAILED DESCRIPTION

Figure 1:
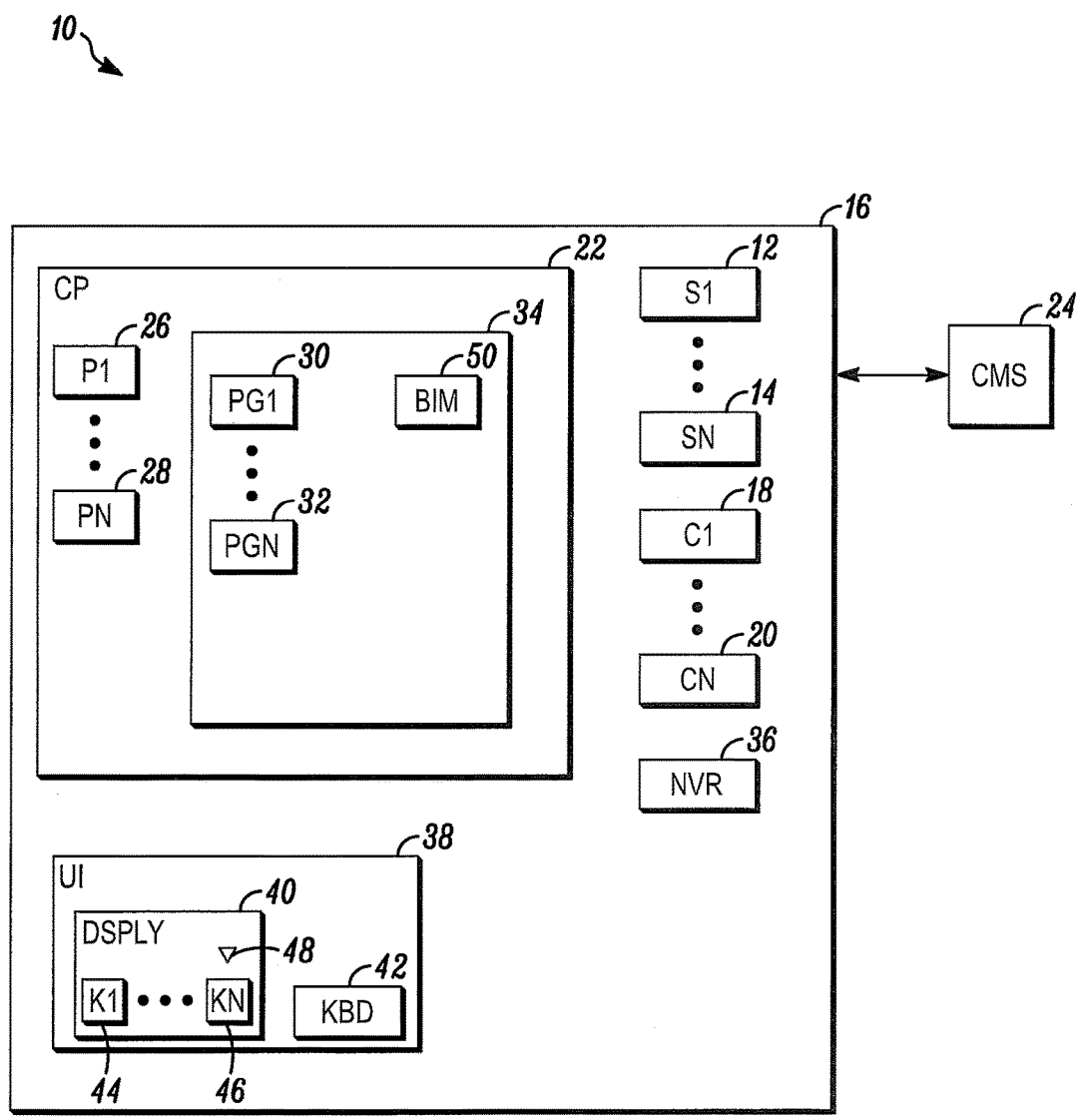
FIG. 1 illustrates a block diagram of a security system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a block diagram of a security system 10 shown generally in accordance with an illustrated embodiment. Included within the system may be a number of sensors 12, 14 used to detect threats within a secured area 16.

The sensors may be based upon any of a number of different technologies. For example, at least some of the sensors may be limit switches operating as intrusion sensors placed on doors and/or windows that allow access into and egress from the secured area. Alternatively, the sensors may be passive infrared (PIR) sensors that detect intruders that have been able to surmount any physical barrier (e.g., doors, walls, etc.) surrounding the secured area.

The sensors may also include one or more environmental sensors such as or flame and/or gas detectors. The environmental sensors may be distributed throughout the secured area.

The secured area may also include a number of video cameras 18, 20. The cameras may be located throughout the secured area or in specific area where threats are known to frequently occur.

The sensors and cameras may be monitored by a control panel 22 located within the secured area or at a remote location. Upon detecting a threat via one of sensors or cameras, the control panel may compose and send an alarm message to a central monitoring station 24.

Included within the control panel is control circuitry that provides the functionality of the security system. The control circuitry may include one or more processor apparatus (processors) 26, 28, each operating under control of one or more computer programs 30, 32 loaded from a non-transitory computer readable medium (memory) 34. As used herein, reference to a step of a computer program is also reference to the processor that executed that step.

Included within the memory of the security system may be a building information model (BIM) file 50. The BIM file may include a map that includes three dimensional information (i.e., geographic coordinates) of structural elements of the secured area. The BIM model may also include the geographic coordinates of each of the cameras within the secured area.

The security system may also include a network video recorder (NVR) 36. The NVR records video from each of the cameras into a respective file within memory. The file includes an identifier of the respective camera providing each of the video frames and a time of recording of each frame. The file may also include an identifier of the geographic area captured in the images.

A user interface (UI) 38 is provided for control of the security system and its cameras. In this regard, video from the cameras may be presented on a display 40. Selection of the cameras for display on the screen of the display may be accomplished via a touch sensitive screen of the display and a graphical user interface (GUI) or through a separate keyboard 42.

For example a interface processor may present a set of icons (software control keys) 44, 46 along a side of the display. At least some of the control keys may be associated with each of the cameras. In order to show video from a camera on the display, the operator may use a mouse to place a cursor 48 over the icon of the camera and activate a switch on a mouse associated with the cursor. The interface processor may monitor the position of the cursor and upon detecting the cursor over the icon of a camera and activation of the switch, the interface processor may activate a display processor associated with the camera. The display processor may open a window on the display that shows real time images from the camera within the window.

In addition to showing images from individual cameras, at least some of the control keys may be used to show groupings of cameras (salvos of cameras) within the same window or different windows. Similarly, other control keys may be used to activate cameras in selected portions of the secured area.

In general, closed circuit television (CCTV) operators find that conventional security system applications are not very operator friendly in terms of live monitoring and configuration. It would be desirable if CCTV operators could concentrate more on the activities happening in the cameras and monitored areas rather than the access and control requirements.

For example, under one scenario, a CCTV operator may notice suspicious activity involving a person or object in the field of view of a particular camera. In this case, the operator is more interested in getting as much detail as possible from the cameras and sensors of the monitored area, since once recorded, the video cannot be enhanced to any real extent.

In most cases, it is difficult to exploit the highest possible picture capability of all cameras in a system due to system design and operational costs. For example (because of bandwidth limitations), an NVR used in conjunction with 32 cameras may not have the ability to record video with maximum resolution and frames per second.

In general, a system should be constructed with the capability of boosting recording quality in certain situations. For example, in the case of a security event, the setting of video quality parameters could be increased to a maximum level. However, this would need to be pre-configured and it is often hard to judge when to implement this kind of setting, since suspicious activity can be observed in any camera throughout the premises.

Under one illustrated embodiment, the adjustment of settings can be accomplished via a set of very simple steps performed by a human operator or user. For example, the security system may detect an event and the user may define a high-risk area around the event. In another embodiment, the user can perceive suspicious activity in live video, identify a camera providing a view of the event on a map and define the high-risk area around the camera.

More than one high risk area can be identified at any one instant in time. In each case, the operator defines an area around the event.

Upon detecting an event or suspicious activity, the video quality parameters of that camera may be increased (or decreased) based upon the perceived risk. While certain parameters will be discussed below, any quality parameter may be adjusted to improve the image quality.

Upon identification of a high-risk area, the video quality of at least some cameras in that area may be increased. In other non-designated areas (low-risk areas), the video quality parameters may be decreased to preserve system bandwidth. In still other areas, (e.g., server room, data center, etc.), the quality may be considered as mission critical and may never be decreased.

In other embodiments, some cameras within a system may be designated only for live monitoring and not for recording. If one of these cameras is found within a high risk zone, then the system automatically begins recording these cameras for so long as the area remains under the high risk designation.

Figure 2:
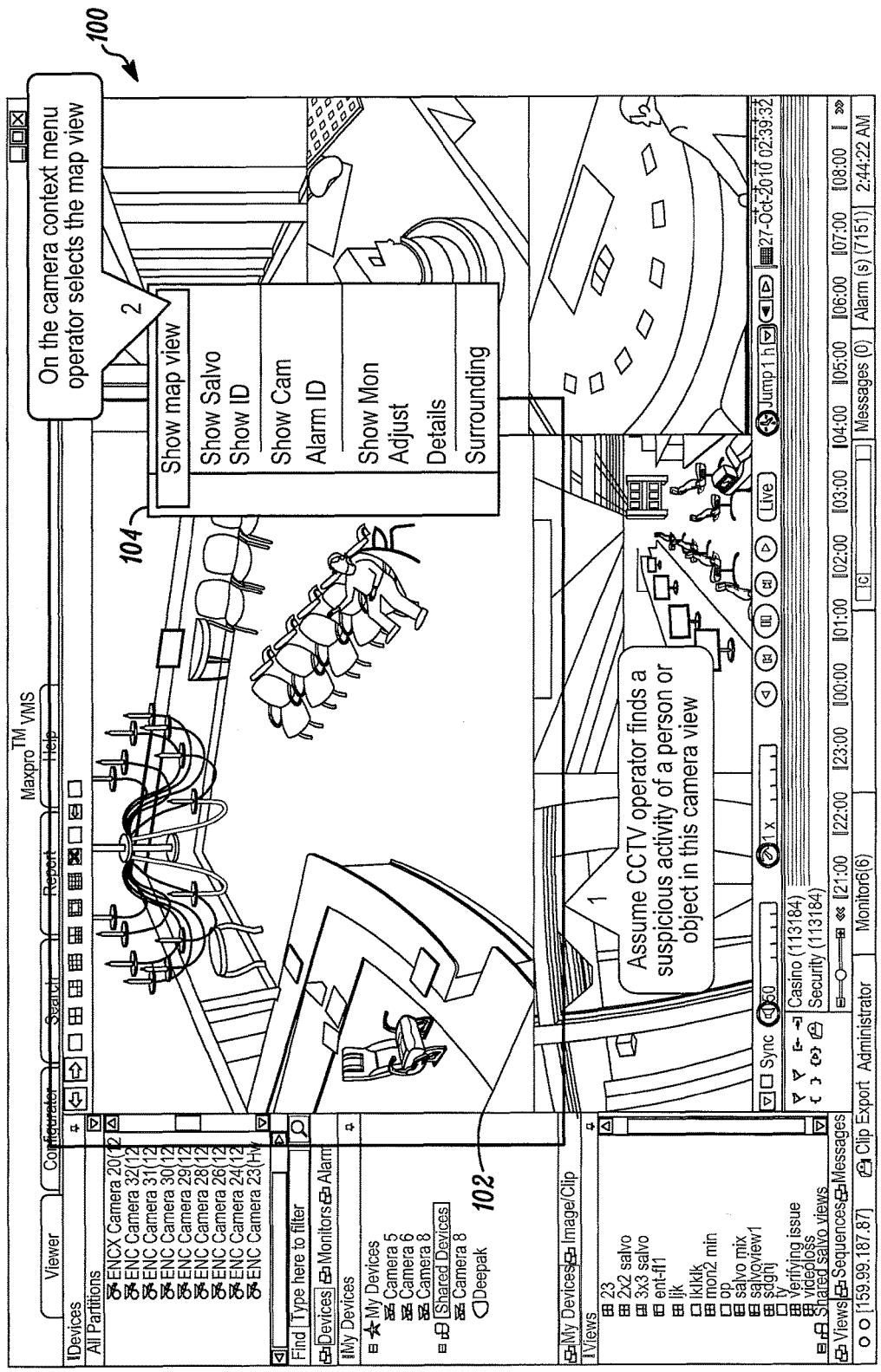
FIG. 2 is a screen of video windows that may be displayed by the system of FIG. 1.

In general, FIG. 2 shows a screen 100 that may be shown on the display of the user interface. While viewing the screen, the operator may notice a suspicious activity (step 1) of a person or object in one of the camera views.

In response, the operator may use the cursor to select the window 102 showing the suspicious activity. The interface processor may detect the selection of the window and display a menu of control keys that may be individually selected to better observe and record the suspicious activity.

Figure 3:
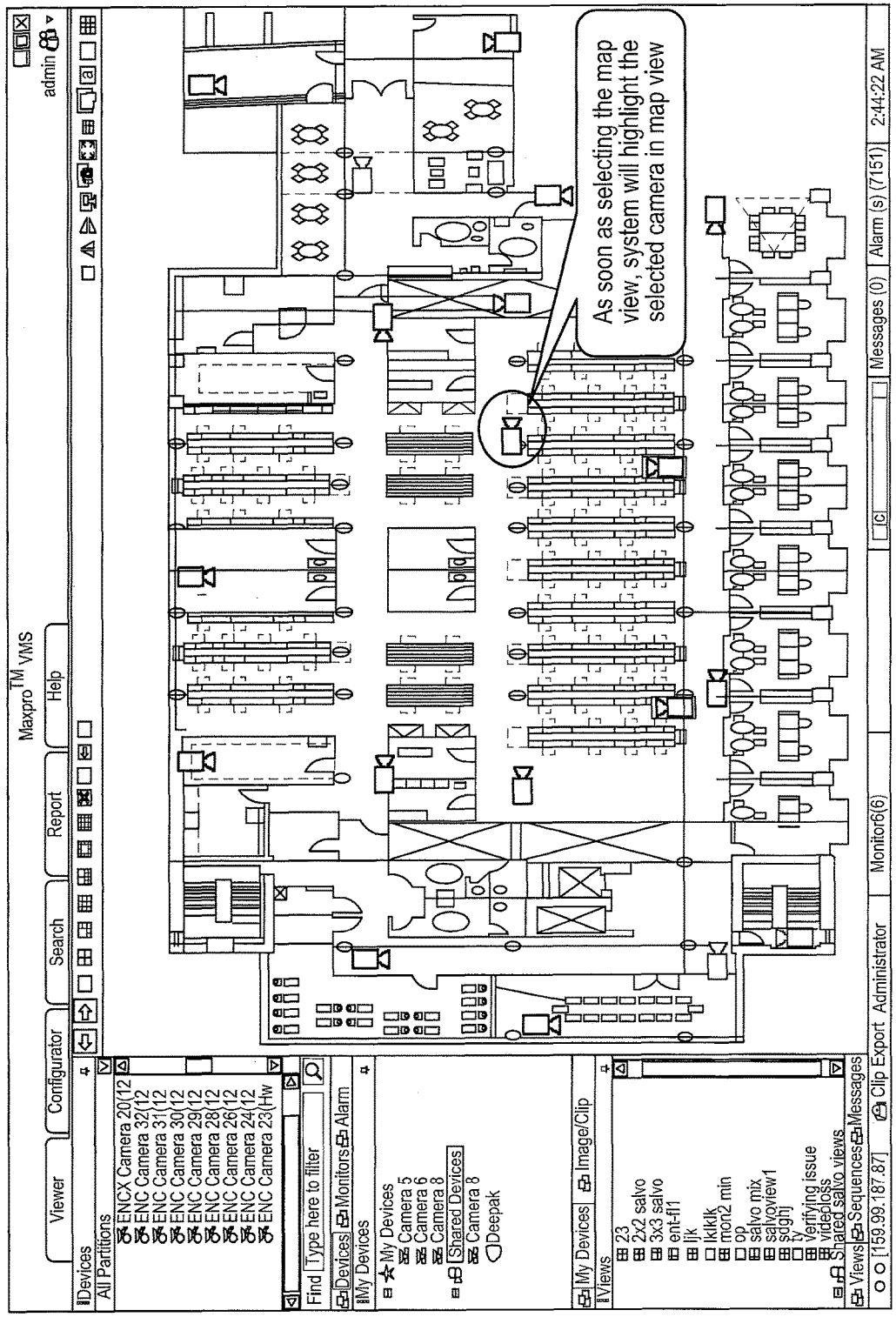
FIG. 3 is a map of a secured area protected by the security system of FIG. 1.

For example, the operator may select (step 2 of FIG. 2) the control key labeled "Show Map View" or the operator may select a BIM icon on the display. In response, the interface processor may detect selection of the Show Map View or BIM control key and transfer an identifier of the camera from the selected window to a map processor. The map processor, in turn, retrieves the map of the secured area from the BIM file and depicts the map on the user interface as shown in FIG. 3. The camera providing the selected view may be shown superimposed over the map and may be depicted as a highlighted (or flashing) image of a camera. The processor may also depict a circle, any geometrical shape, or hand drawing around the camera, as shown in FIG. 3.

Next, the operator may select (step 1 in FIG. 4) a portion of the secured area for enhanced viewing of the suspicious activity. The operator may identify the selected portion by encircling the selected portion with a line drawn over the map of the secured area shown on the display. To do this, the operator may place the cursor over the selected portion and activate a switch on the mouse followed by moving the cursor along the line around the selected portion of the secured area. Upon finishing the circle or other shape, the user releases the switch on the mouse to complete identification of the portion. Upon releasing the switch, the interface processor may also display a menu of risk associated with the selected portion.

Alternatively, the user may use his/her finger to trace the outline of the selected portion. In this case, the interface processor detects the initial contact of the user's finger and interruption of contact.

The interface processor detects the initial activation of the switch (or contact by the use's finger) and the relative geographic location of the cursor at the location. The interface processor then tracks the cursor as a succession or locus of geographic locations as the user traces the circle or other shape enclosing the selected portion.

Figure 4:
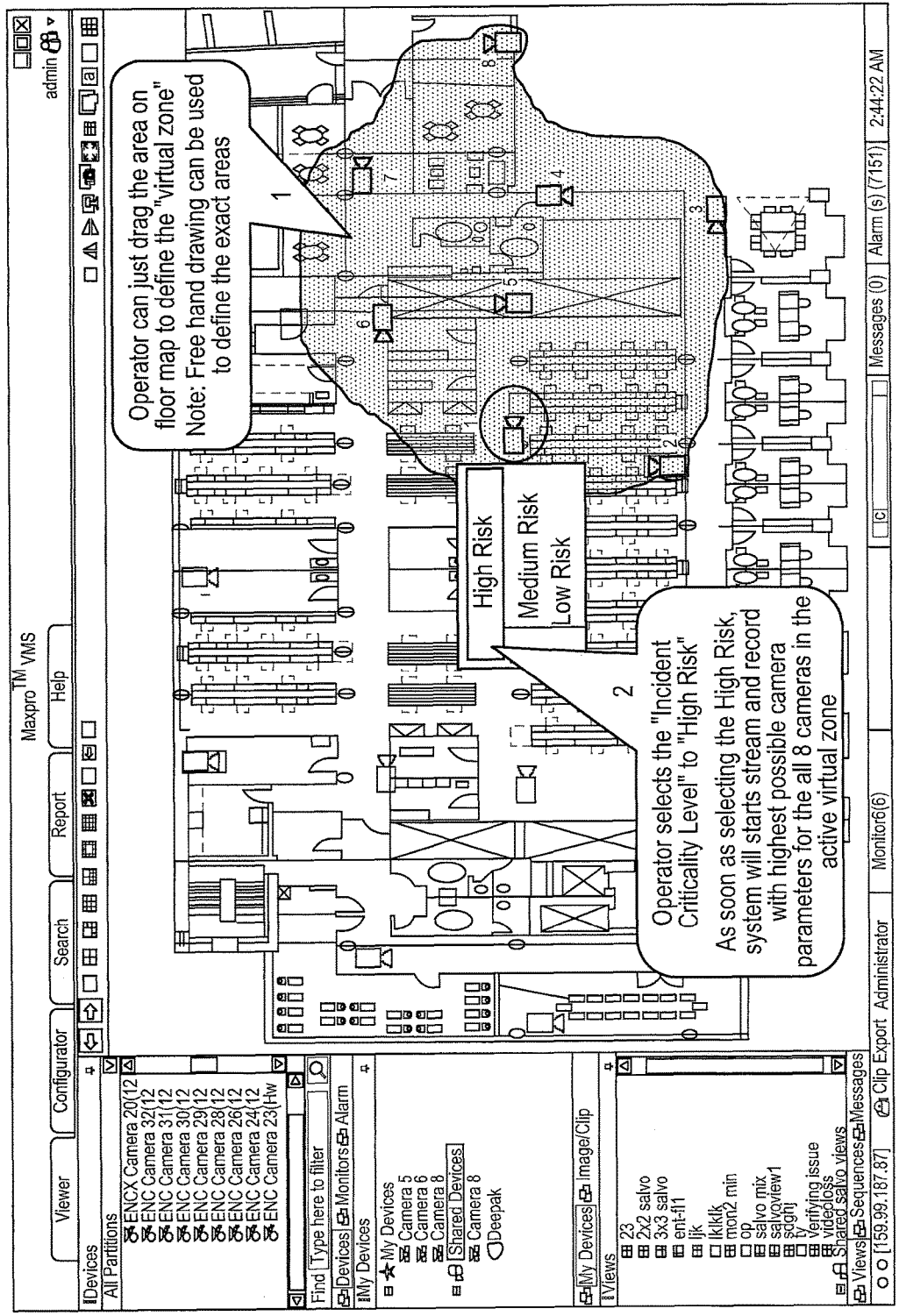
FIG. 4 depicts the map of FIG. 3 with a portion identified for a higher level of surveillance.

The interface processor may then transfer the locus of points to an identification processor that identifies any additional cameras within the selected portion. The identification processor may do this by comparing the geographic coordinates of each camera within the secured area with the geographic coordinates of the area surrounded by the line. The identification processor (or the interface processor) may superimpose any identified cameras over the selected portion as shown in FIG. 4 along with an identifier of the camera.

Next the user may select (step 2 in FIG. 4) the level of risk within the selected portion. In this regard, the selected level of risk defines the level of picture quality provided by each of the cameras within the selected portion.

The level of picture quality may be changed or otherwise improved by a picture quality processor detecting the selection of the portion of the secured area and level of risk. In response, the processor may adjust one or more camera parameters (e.g., the resolution of each frame (usually increased to obtained a more detailed image), the number of frames per second (FPS) (increased to get more image detail), the size of a group of pictures (GOP) (usually decreased to get better picture quality, the compression ratio (usually decreased to get better picture quality), the bit rate (usually increased to get more data), etc.). Any camera parameter that increases or decreases the video quality can be considered and not limited to those discussed herein. In this regard, each of the risk levels may have a different set of camera parameters associated with each risk level.

In addition, each identified camera may have its own set of parameter associated with each threat level. This may be necessary because of the location of certain cameras. For example, a camera near an entrance or near a high value asset in a home or factory may require a greatly enhanced picture quality upon the detection of suspicious activity.

The picture quality processor may also automatically adjust the picture quality level of other cameras located outside of the selected portion (e.g., to CIF resolution, 1 FPS, etc.). In this case, the picture quality processor may reduce a picture quality level of cameras outside of the selected portion in order to conserve bandwidth. For example, the NVR may be limited in capacity and the reduction in bandwidth of the other cameras may be necessary so as not to exceed the processing capability of the NVR.

Similarly, the CCTV operator may manually by encircle a particular area and select the low risk designation shown in step 2 of FIG. 4. In this way, an operator can separately configure low risk areas.

As a more specific example, a NVR may have a frame rate limitation of 480 FPS and would only be able to handle 16 cameras providing video at 30 FPS. Under the illustrated embodiment (and where there are more than 16 cameras), high risk cameras are set to 30 FPS and non-risk are set to less than 30 FPS.

Under the illustrated embodiment, the identification of a portion of the secured area along with selection of a high threat level for that portion causes the security system to enhance the quality of images delivered from each of the identified cameras to the monitors of the guard station. The enhanced level of image quality may be maintained for a predetermined time (e.g., 5 minutes, 10 minutes, etc.) after the initial detection of suspicious activity. Alternatively, the user may activate a control key to cancel the enhanced image quality at any time.

The enhanced level of picture quality allows the human user of the security system to better observe the nature of the suspicious activity. The enhanced level of activity is also a feature of the video recorded by the NVR. In this case, the enhanced level of picture quality allows for better forensic analysis of the suspicious activity at a later time if the suspicious activity were part of a criminal act.

Figure 5:
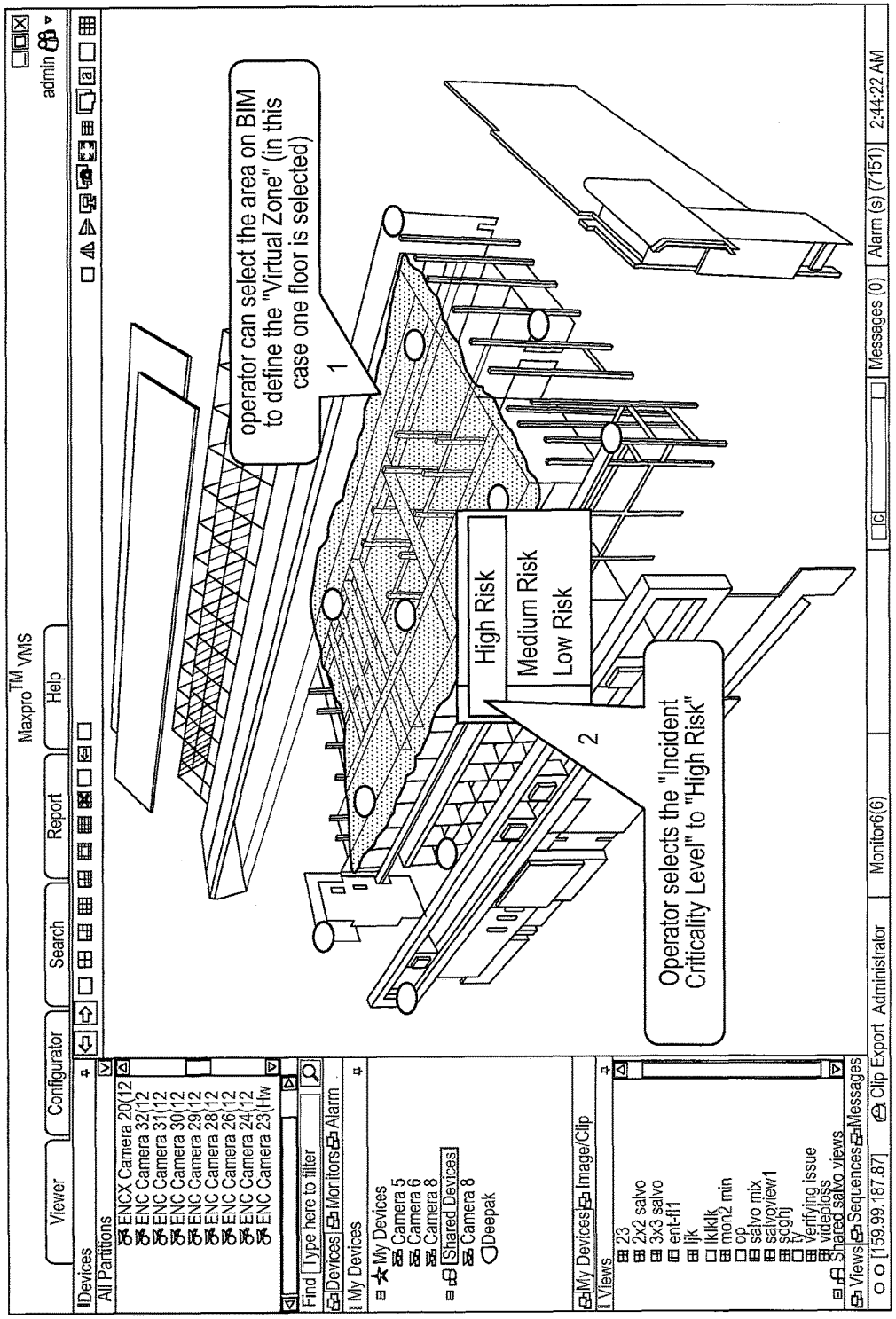
FIG. 5 depicts a three-dimensionally map and selected portion of the secured area protected by the security system of FIG. 1.

FIG. 5 depicts another example of the use of the system. In the example of FIG. 5, the user has selected an exploded, three-dimensional (3-D) model or map of a building from the BIM file. In this example, the user may use a model processor to navigate up and down through the 3-D model of the building. Graphical representations of the secured area may be presented as 2-D floor maps, site maps or CAD drawings and where maps or drawings can be under JPEG or BMP formats.

As also shown (step 1 in FIG. 5), the user has selected a particular floor of the building and has drawn a line around a portion of the floor. In this example, the identification processor has identified and displayed a number of cameras inside and outside of the selected portion of the floor. In a second step (step 2 in FIG. 5), the user has selected a high risk level in order to control the image quality within the selected portion of the floor of the building.

The advantage of the example of FIG. 5 is that the user can observe other cameras in the area of the suspicious activity. This allows the user to cancel the selection of the portion and re-enter a larger or smaller portion of the secured area for purposes of changing the image quality of a larger or smaller number of cameras.

Figure 6:
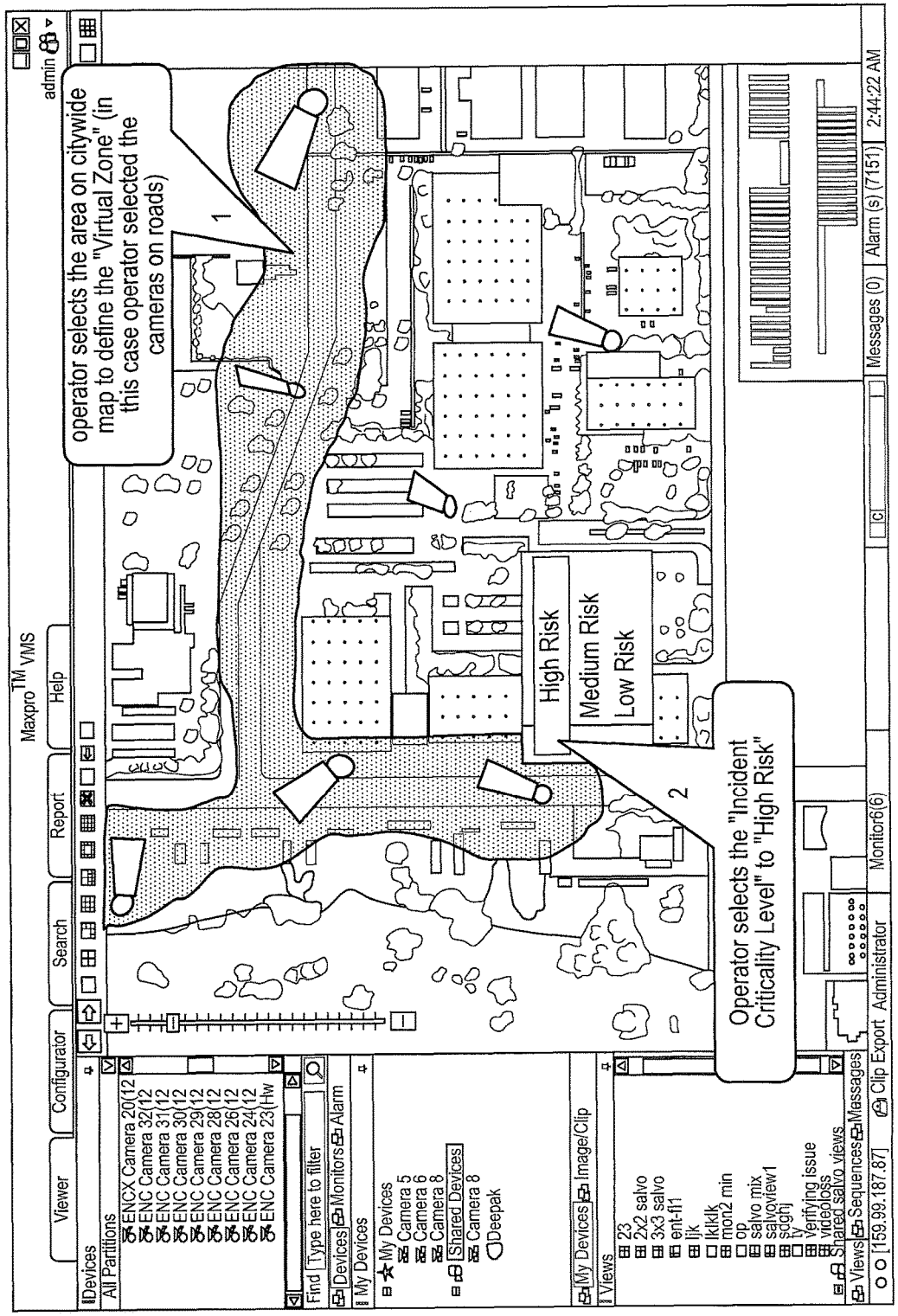
FIG. 6 depicts a street-level map and selected portion of the secured area protected by the security system of FIG. 1.

FIG. 6 depicts a still further example. In this case, the user has (step 1 of FIG. 6) selected a city wide map from the BIM file for purposes of drawing a line around a set of streets and associated areas. In the second step (step 2 of FIG. 6), the user selects the risk level that defines the image quality of each camera within the selected portion.

In general, the system may execute the steps including a processor of a surveillance system detecting identification of a portion of a secured area via a drawing made by an operator on a diagram of the secured area, the processor identifying at least one camera within the identified portion of the secured area, the processor increasing a relative level of picture quality for each of the at least one camera and the processor recording video with the increased level of picture quality from each of the identified at least one camera for a predetermined time period where the picture quality is increased by performing one or more increasing image resolution, increasing frames per second, decreasing a group of pictures (GOP) value, decreasing a compression ratio and increasing a bit rate.

Alternatively, the system includes a processor of a surveillance system that detects identification of a portion of a secured area via a drawing made by an operator on a diagram of the secured area, a processor of the surveillance system that identifies at least one camera within the identified portion of the secured area, a processor of the surveillance system that increases a relative level of picture quality for each of the at least one camera and a recorder that records video with the increased level of picture quality from each of the identified at least one camera for a predetermined time period where the picture quality is increased by performing one or more of increasing image resolution, increasing frames per second, decreasing a group of pictures (GOP) value, decreasing a compression ratio and increasing a bit rate.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated; from the described flows, and other components may be add to, or removed from the described embodiments.

The invention claimed is:
1. A method comprising:
a processor of a surveillance system recording first video with a first level of a picture quality for a first camera;
the processor recording second video with the first level of the picture quality for a second camera;
the processor detecting a selection of a first portion of a secured area, wherein the selection of the first portion of the secured area is received via an operator drawing a shape on a diagram of the secured area displayed on a user interface, and wherein the processor detects a second portion of the secured area outside of the first portion of the secured area as an unselected zone;

the processor identifying the first camera within the first portion of the secured area;

the processor recording the first video with a second level of the picture quality for the first camera for a predetermined time period, wherein the second level of the picture quality includes increased video quality relative to the first level of the picture quality by increasing image resolution, increasing frames per second, decreasing a group of pictures (GOP) value, decreasing a compression ratio, or decreasing a bit rate;

the processor identifying the second camera within the unselected zone;

the processor recording the second video with a third level of the picture quality for the second camera for the predetermined time period, wherein the third level of the picture quality includes decreased video quality relative to the first level of the picture quality by decreasing the image resolution, decreasing the frames per second, increasing the GOP value, increasing the compression ratio, or increasing the bit rate; and the processor recording the first video with the second level of the picture quality for the first camera for the predetermined time period concurrently with recording the second video with the third level of the picture quality for the second camera for the predetermined time period, wherein the first video with the first level of the picture quality and the second video with the first video quality combined does not exceed a predetermined imposed bandwidth constraint, and wherein the first video with the second level of the picture quality and the second video with the third video quality combined does not exceed the predetermined imposed bandwidth constraint.

2. The method as in claim 1 wherein the shape is defined by a finger of the operator tracing an outline over the first portion of the secured area.

3. The method as in claim 1 further comprising:
the operator observing suspicious activity via the user interface displaying an image from the first camera; and
the operator clicking on an icon of a building information model (BIM) of the secured area.

4. The method as in claim 3 further comprising the processor highlighting the first camera on the BIM.

5. The method as in claim 1 further comprising the operator selecting a criticality level of a recording of the first video.

6. The method as in claim 5 further comprising the processor selecting the image resolution for the first camera based upon the criticality level.

7. The method as in claim 1 wherein the shape includes any geometrical shape or hand drawing that defines a boundary encompassing the first portion of the secured area.

8. The method as in claim 1 wherein the first portion of the secured area includes a building within the secured area.

9. The method as in claim 8 wherein the first portion of the secured area includes a floor of the building.

10. The method as in claim 1 wherein the first portion of the secured area includes a street passing through the secured area.

11. A system comprising:
a recorder that records first video with a first level of a picture quality for a first camera and that records second video with the first level of the picture quality for a second camera; and a processor of a surveillance system that detects an identification of a first portion of a secured area, wherein the identification of the first portion of the secured area is received via an operator drawing a shape on a diagram of the secured area displayed on a user interface, that identifies the first camera within the first portion of the secured area, that increases the first level of the picture quality for the first camera to a second level of the picture quality for the first camera, that detects a second portion of the secured area outside of the first portion of the secured area as an unselected zone, that identifies the second camera within the unselected zone, and that decreases the first level of the picture quality for the second camera to a third level of the picture quality for the second camera, wherein the recorder concurrently records the first video with the second level of the picture quality for the first camera for a predetermined time period and the second video with the third level of the picture quality for the second camera for the predetermined time period, wherein the second level of the picture quality is increased relative to the first level of the picture quality by performing one or more of increasing image resolution, increasing frames per second, decreasing a group of pictures (GOP) value, decreasing a compression ratio, and decreasing a bit rate, wherein the third level of the picture quality is decreased relative to the first level of the picture quality by performing one or more of decreasing the image resolution, decreasing the frames per second, increasing the GOP value, increasing the compression ratio, and increasing the bit rate, wherein the first video with the first level of the picture quality and the second video with the first video quality combined does not exceed a predetermined imposed bandwidth constraint, and wherein the first video with the second level of the picture quality and the second video with the third video quality combined does not exceed the predetermined imposed bandwidth constraint.

12. The system as in claim 11 wherein the user interface is a touch sensitive screen, and wherein the shape is defined by a finger of the operator tracing an outline over the first portion of the secured area displayed on the touch sensitive screen.

13. The system as in claim 11 wherein the operator observes suspicious activity via the user interface displaying an image from the first camera and clicks on a building information model (BIM) icon.

14. The system as in claim 13 wherein the processor highlights the first camera on the diagram of the secured area.

15. The system as in claim 11 wherein the operator selects a criticality level of the first video recorded.

16. The system as in claim 15 wherein the processor selects the image resolution based upon the criticality level as selected.

17. The system as in claim 11 wherein the shape includes a geometric shape encompassing the first portion of the secured area.

18. A system comprising:
a surveillance system;
a recorder that records or displays first live video with a first level of a picture quality for a first camera and that records second video with the first level of the picture quality for a second camera;

a first processor of the surveillance system that detects an identification of a selected first portion of a secured area and that detects a second portion of the secured area outside of the selected first portion of the secured area as an unselected zone, wherein the identification of the selected first portion of the secured area is received via an operator drawing a shape on a diagram of the secured area displayed on a user interface;

a second processor of the surveillance system that identifies the first camera within the selected first portion of the secured area and the second camera within the unselected zone; and a third processor of the surveillance system that increases the first level of the picture quality for the first camera to a second level of the picture quality for the first camera and concurrently decreases the first level of the picture quality for the second camera to a third level of the picture quality for the second camera, wherein the recorder records or displays the first live video with the second level of the picture quality for the first camera for a predetermined time period and records the second video with the third level of the picture quality for the second camera for the predetermined time period, wherein the second level of the picture quality is increased relative to the first level of the picture quality by performing one or more of increasing image resolution, increasing frames per second, decreasing a group of pictures (GOP) value, decreasing a compression ratio, and decreasing a bit rate, wherein the third level of the picture quality is decreased relative to the first level of the picture quality by performing one or more of decreasing the image resolution, decreasing the frames per second, increasing the GOP value, increasing the compression ratio, and increasing the bit rate, wherein the first video with the first level of the picture quality and the second video with the first video quality combined does not exceed a predetermined imposed bandwidth constraint, and wherein the first video with the second level of the picture quality and the second video with the third video quality combined does not exceed the predetermined imposed bandwidth constraint.

19. The system as in claim 18 further comprising a third camera within the secured area designated as always critical, wherein the picture quality for the third camera is never changed because of a critical function of the third camera.

20. The system as in claim 18 further comprising a fourth processor of the surveillance system that detects an event within the secured area, identifies the first camera as being associated with the event, and highlights the first camera on a map displayed on the user interface for use by the operator in the identification of the selected first portion of the secured area.

21. The system as in claim 18 further comprising a user input that receives the identification of the selected first portion of the secured area based upon the operator viewing the first live video and detecting suspicious activity in the first live video.

* * * * *